Sept. 9, 1941.  J. F. HALSTEAD  2,255,740
CHARGE SEPARATING AND ROLLING MEANS FOR CIGAR BUNCH MACHINES
Filed Oct. 27, 1938  5 Sheets-Sheet 1

INVENTOR
JOHN F. HALSTEAD
BY 
ATTORNEY

Sept. 9, 1941. J. F. HALSTEAD 2,255,740
CHARGE SEPARATING AND ROLLING MEANS FOR CIGAR BUNCH MACHINES
Filed Oct. 27, 1938 5 Sheets-Sheet 2

INVENTOR
JOHN F. HALSTEAD
BY George Hastings
ATTORNEY

Sept. 9, 1941.  J. F. HALSTEAD  2,255,740
CHARGE SEPARATING AND ROLLING MEANS FOR CIGAR BUNCH MACHINES
Filed Oct. 27, 1938  5 Sheets-Sheet 3

INVENTOR
JOHN F. HALSTEAD
BY
ATTORNEY

Sept. 9, 1941.   J. F. HALSTEAD   2,255,740
CHARGE SEPARATING AND ROLLING MEANS FOR CIGAR BUNCH MACHINES
Filed Oct. 27, 1938   5 Sheets-Sheet 4

INVENTOR
JOHN F. HALSTEAD
BY George S. Hastings
ATTORNEY

Sept. 9, 1941.   J. F. HALSTEAD   2,255,740
CHARGE SEPARATING AND ROLLING MEANS FOR CIGAR BUNCH MACHINES
Filed Oct. 27, 1938   5 Sheets-Sheet 5

INVENTOR
JOHN F. HALSTEAD
BY George S. Hastings
ATTORNEY

Patented Sept. 9, 1941

2,255,740

UNITED STATES PATENT OFFICE 2,255,740

CHARGE SEPARATING AND ROLLING MEANS FOR CIGAR BUNCH MACHINES

John F. Halstead, Brooklyn, N. Y., assignor to International Cigar Machinery Company, a corporation of New Jersey Application October 27, 1938, Serial No. 237,254

52 Claims. (Cl. 131—21)

This invention, which relates to cigar machines, has particular reference to improvements in charge forming and bunch rolling mechanisms therefor, and constitutes improvements to the machine shown and described in my co-pending application, Serial No. 117,180, filed December 22, 1936, for Cigar machine.

One of the chief objects of this invention is to furnish mechanism for making cigars which will be more uniform in cross section and hence will burn square by substantially eliminating the formation of bunches having flat portions or similar undesirable imperfections which are generally caused by cutting relatively narrow and thick charges from a stream of edge to edge abutting bunch length sections. In cutting at right angles to the stream of tobacco, the bunch charges thus formed may have hard, longitudinal edges which may still retain this unwanted characteristic as a "flat" portion in the finished bunch and cigar. According to my invention, however, all bunch length sections of tobacco are placed in a vertical magazine and compose therein a column of superposed or laminated sections, each section maintaining its individual characteristics in the column, especially insofar as the longitudinal edge portions are concerned. In separating bunch charges of tobacco from this column, a device is provided which moves parallel to the laminations in the column and separates therefrom thin flat bunch charges or layers substantially equal in width to the bunch sections originally fed to the column so that the edges of bunch charges thus formed will always be soft, and, therefore, can never transport into a finished bunch anything approximating a "hard" portion generally encountered in bunches formed by charges produced in other ways, such as mentioned above.

In the production of bunch charges, according to this invention, therefore, a minimum of cutting results from the novel manner in which the tobacco is handled. This is due to the fact that the cutting device moves in a plane parallel to the laminations of tobacco in the column, and in effect separates one layer from the column while merely cutting those portions of tobacco which tend to obstruct the forward movement of the separating device. It is an added object of this invention to provide means for forming more perfect bunch charges by the provision of means which retain the original characteristics of bunch sections substantially as originally cut and fed to the storage magazine and provide means for separating bunch charges from the magazine with a minimum of cutting.

It is a further object of the invention to provide mechanism for forming a vertical column of laminated bunch lengths of tobacco, separate bunch charges in the form of substantially thin flat layers, and deliver successive layers to a transfer member which moves to a bunch rolling unit where each charge is delivered to, and deposited upon the Chianti belt thereof as an entirety in substantially the same condition as when cut from the column, and thereby form charges which when rolled into bunches will be substantially free of flat portions and other unwanted imperfections.

It is a further object of the invention to provide an improved bunch charge transfer pocket which will effectively deliver successive thin layers or charges of tobacco fed thereto to a bunch rolling device and which is provided with means for moving the bottom of the transfer pocket to allow a charge held therein to move as an entirety onto the belt.

According to my invention, the thin flat bunch charges composed of superposed leaves and pieces of tobacco transferred to the Chianti belt, are disposed thereon in flat condition, and in such form each charge is rolled upon itself somewhat in a manner similar to that employed in rolling up a carpet, so that instead of forcing the pieces of tobacco together to form a bunch, as has been customary in the past, the layer is spirally rolled upon itself and thus converted into a superior type of bunch. It is an added object, therefore, to provide an improved method of forming cigar bunches wherein tobacco of the charge is rolled upon itself in spiral form to make a bunch.

According to the present invention, the bunch rolling operation is divided into several phases. The flat charge after being positioned upon a rolling apron is first rolled or spiralled upon itself to form a loose bunch like article. Following this, the rolling belt is tensioned to restrict the loose bunch peripherally and reduce it to a diameter approximating the finished bunch. The next stage consists in the application of a binder to the constricted tobacco roll and its discharge from the rolling table as a raw bunch. My novel method of forming a cigar bunch, therefore, relates somewhat generally to that for making a so-called "Spanish" bunch, but differs therefrom in several fundamentals due chiefly to the fact that the "Spanish" bunch is tightly rolled from a plurality of overlapped leaves, an operation which causes the tobacco leaves to tightly grip one another and results in "plugging" or a cutting down of the air passages through the cigar.

According to my method described hereinbefore, the several steps employed result in the provision of adequate longitudinal smoke passages which contribute greatly to the quality of cigars made in this manner, the bunch will always be uniform, and ordinary long filler leaves may be used in forming the flat charges. Cigars made in this manner will burn square because the air passages are more uniformly distributed over the whole area of the cigar cross section. This invention, therefore, consists also in a novel method for making cigars wherein a layer of superposed pieces of tobacco constituting a bunch charge is rolled upon itself into loose bunch form and then constricted peripherally to a given diameter prior to its envelopment in a binder.

The invention also consists in the provision of improved mechanism for rolling a thin layer of filler tobacco upon itself into bunch form and means for maintaining each charge substantially flat in order that it may be spiralled upon its delivery to the rolling mechanism. In order to achieve this object, mechanism is provided wherein the rolling pin unit has associated therewith a member functioning to hold a charge in relatively flat condition upon the rolling belt during the progressive stages of the rolling operation, and means are also provided for controlling the tension of the rolling belt at a predetermined time to constrict the loose tobacco roll peripherally and reduce its diameter to a predetermined size.

In the formation of bunch length sections, it is customary to feed tobacco to a device which delivers a continuous stream of tobacco to a cutter operating cyclically to cut bunch length sections therefrom. Since the tobacco is generally fed into the feed device manually, it is practically impossible to insure that the cross section of the stream will be constant, and hence it has been found in many instances that the edges thereof taper off generally from the center, with the result that the center of the stream is higher than at the edges. From this it follows that when a plurality of sections are placed in a magazine to form a vertical laminated column of lengths therein, there is a possibility that the edge portions thereof may not be as dense as the center. In order to compensate for this defect in the feeding of tobacco, I have provided a member having attached thereto upon its tobacco engaging face a compressible material which when brought into engagement with the top of the column, will compress the tobacco thereof also around the edges, and thereby provide a cross section of substantially uniform density of tobacco at the bottom of the column or adjacent the supporting plate and at the line where a charge is separated from the column, and thereby considerably reduce the number of voids. The pressure around the edges also holds the tobacco firmly during the cutting operation, and thereby prevents pieces of tobacco from being torn loose and separated from the shaped ends of the charge. In order to insure against relatively large variations in the density of successive charges cut from the column, it is also an added object of the invention to provide mechanism for determining the density of a prospective charge before it has been separated from the column, and set into motion means for compensating for any lack of tobacco in the proposed charge by automatically effecting the feed of more or less tobacco to the charge separating devices.

With these and other objects not specifically mentioned in view, the invention consists in certain combinations and constructions which will be hereinafter fully described, and then specifically set forth in the claims hereunto appended.

In the accompanying drawings, which form a part of this specification, and in which like characters of reference indicate the same or like parts.

Referring to the drawings, the plates 20, 21 and 22 (Fig. 1) which constitute the side walls of a vertical filler supply magazine, designated generally 23, are placed and supported in the same manner as in my above mentioned co-pending application. A pressure plate 24 secured at 25 to a slide 26 mounted in a runway 27 of a bracket 28 and retained by a plate 29 attached thereto by screws 30, is operated to compress and guide the filler tobacco supply held in the magazine 23 by a bottom plate 31. The bracket 28 is secured to the side of plate 21 and furnishes a bearing for a shaft (not shown) upon which is fixed a lever having connections to slide 26 in a manner similar to that shown in my co-pending application. The other end of this shaft is connected to the well-known cross feed control mechanism, also disclosed in the above mentioned application, which will prevent additional filler tobacco from being fed whenever a predetermined surplus exists in the magazine 23. The magazine bottom plate 31 is attached to a bracket 32 projecting from a slide 33 arranged for vertical travel in a bracket 34 suitably attached to the frame of the machine. Slide 33 is provided with a plurality of rollers 35 which engage in tracks 36 of bracket 34, and in this manner insures the free movement of the slide as it reciprocates vertically under the influence of a cam actuated link 37 engaging a stud 38 mounted on slide 33 and guided in a slot 39 in link 37.

In the illustrated embodiment the filler tobacco T is fed in a continuous stream onto a movable platform 40, when the platform is located in a horizontal plane or in its receiving position. After a predetermined length of tobacco has been fed upon the platform, a corrugated cutter (not shown) coacting with similar corrugations in platform 40, cuts a bunch length from the stream. The feeding and cutting mechanism may be similar to that shown in my above identified copending application. Following the severance of a bunch length from the stream, platform 40 is lowered to a position where the length can be removed therefrom and placed in the vertical magazine 23.

The platform 40 is fixed to an arm 41 which is raised and lowered by means of a link 42 connected to a suitable cam (not shown). When platform 40 is in its inclined or discharge position, its foremost edge rests upon a horizontal gate 43. This gate is mounted for reciprocatory movement, and during the feed of tobacco to the magazine closes the opening by being projected over the space between the walls 20 and 21. Bunch lengths of tobacco resting upon platform 40 are discharged therefrom onto gate 43 by means of a rake 44, provided with a plate 45 adapted to engage the rear edge of each bunch length and sweep it from the platform in the manner described. Plate 45 which is mounted upon rake 44 in any suitable manner is preferably bevelled at its bottom edge for more effective cooperation with platform 40 and gate 24. Rake 44 moves the cut filler length over gate 43 until it is positioned between the wall plates 20 and 21 directly above the vertical column of tobacco in the magazine.

Figure 1:
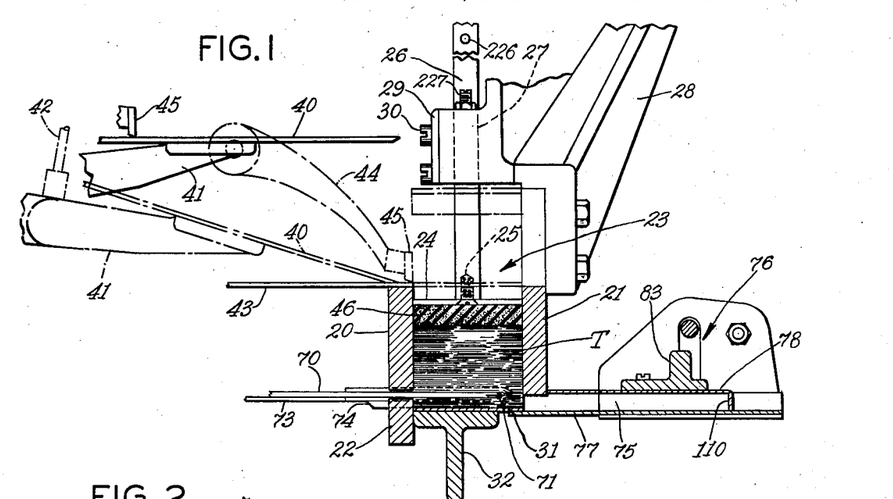
Fig. 1 is an end view of the filler magazine, partially in section, showing mechanism for separating thin charges from the filler supply.

When a filler section or severed bunch length T has been positioned by plate 45 on gate 43 over the tobacco in the magazine 23, the rake 44 occupies the position shown in dot-dash lines in Fig. 1 with plate 45 aligned with wall 20. Plunger 24 is moved downwardly on its slide 26, and the resilient pad 46 carried by the plate 24, descends, and bears against the filler section T supported on gate 43. Simultaneously with the downward movement of plate 24 link member 37 is raised thereby allowing slide member 33 to travel upwardly with the result that tobacco in the magazine is pressed against the underside of the gate 43. The gate is then retracted and the tobacco charge thereon moves into the magazine and forms an added lamination in the column of tobacco. In this manner additional charges are fed into the magazine once each cycle of the machine, and the vertical column is maintained therein as a plurality of laminated layers ready for the separation of successive bunch charges therefrom.

The pressure plate 24 is provided on its tobacco contacting face with a resilient pad 46 and whenever high spots or other inequalities appear in the column of tobacco, the pad will yield at these places and yet exert pressure upon the lower or softer portions thereof in order to press the tobacco carried by the bottom plate 31 to a practically uniform density over the whole area of the charge to be cut off. A uniform density of the charge is necessary in order to produce a bunch having the smallest possible variation in weight. The pad 46, which is preferably made of sponge rubber, or other suitable compressible material, also acts to hold the cut ends of the charge together firmly during the separation of bunch charges from the column, and hence prevents these ends from being broken off during this operation.

In order to prevent damage to the pad 46 carried by plate 24 due to inadvertent engagement of the knife 71, hereinafter described, when the tobacco in the magazine is low or has been exhausted, the cam and lever connections (not shown) normally utilized in reciprocating to raise and lower plate 24, are set to control the downward limit of movement of the plate and pad. In order to further insure that no damage will come to the pad, at any time during the operation of the machine, there has also been provided a pin 226 mounted upon slide 26, which pin is adapted to engage an adjustable set screw 227 mounted upon bracket 28. The set screw is so adjusted that pad 46 will always come to rest above the separating plate 70 and knife 71, regardless of the position of the cam lever and cam which control the reciprocation of slide 26. The above described arrangement of pin 226 and set screw 227 also furnishes a visual guide for an operator to show the height of tobacco in the column because when the pin 226 rests upon set screw 227, it is an indication that either the tobacco in the column is very low or exhausted.

Figures 2, 3, 4:
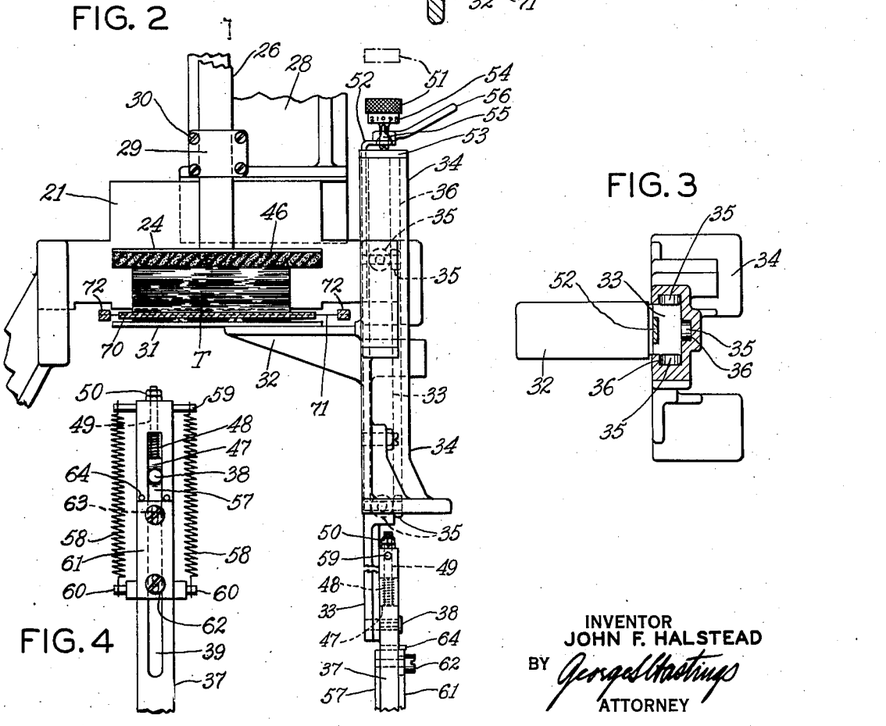
Fig. 2 is a side view of Fig. 1, and, in addition shows the slide and slide bracket of the filler supply chamber.
Fig. 3 is a sectional plan view of a portion of Fig. 2.
Fig. 4 is a side elevation in detail of a portion of the plate elevating mechanism.

A slide block 47 (Figs. 2 and 4) is notched at one end to fit the stud 38 and is fitted to the slot of the link 37 where a spring 48, placed on a stud 49, secured to the other end of the block 47 and passing through the top of the link 37 yieldingly holds it in a position limited by nuts 50 on the stud 49. This feature, in cooperation with an improved stop arrangement to be described, provides for adjustment for different thicknesses of charges.

When a charge is to be separated, the column of tobacco in the magazine, held in compression between pressure plate 24 and magazine bottom plate 31, is moved downwardly by cam actuated links, referred to hereinbefore, with the column of tobacco held therebetween into charge separating position and an adjustable screw 51, carried by a holder 52 secured to the slide 33, in any suitable manner, engages a plate 53 attached to the upper end of bracket 34 and stops further descent of the slide 33 and the bottom plate 31. The sliding block 47, previously described as fitted to slot 39 of the link 37 and yieldingly held in position by the spring 48, will compress the spring 48 by the additional travel of the link 37 since the magazine bottom plate 31 and slide member 32 have come to rest, as described. Screw 51 is provided with a graduated barrel 54 which, together with a pointer 55, attached to holder 52, permits the operator of the machine to readily determine the amount of adjustment given screw 51. The turning of screw 51 regulates the thickness of the charge to be separated and when correctly set it is locked in place by a nut 56.

The upward movement of slide 33 is controlled by a sliding block 57 also fitted in slot 39 of link 37, this block being notched at one end to fit stud 38 carried by slide 33 and is yieldingly held against the same by springs 58 stretched between studs 59 of link 37 and studs 60 of the slide block 57. Block 57 is attached to a cover or plate 61 by screws 62 passing through elongated slots 63 provided in the plate 61, thereby permitting adjustment of block 57. The link 37 is also provided with pins 64 which engage and stop the upward movement of plate 61, and block 57 and thereby prevents the pull of springs 58 from compressing the spring 48 of the sliding block 47. The link 37 in ascending causes block 57 to raise stud 38 and its slide 33 until the surplus tobacco on the magazine bottom plate 31 encounters the gate 43 which is then in a position across the support plates 20 and 21 of the magazine 23. It is understood, as previously related, that the gate 43 in this position supports the filler section delivered by the swinging rake 44 which section at this time is subjected to the compressing action of plunger 24. The column of tobacco supported on plate 31 engages the underside of gate 43 and stalls the upward travel of slide 33 and block 57 and actuator stud 38 whereby the link 37 will continue to ascend, idle and lift block 47 from stud 38. The idle travel of the link 37 stretches the springs 58, which in turn, when the link retreats, aid in returning the block 47 against stud 38 and cause the slide 33 to descend as heretofore described.

When the filler supply is in position, a separating plate 70 and a knife 71, which is supported by bracket arms 72 (Fig. 2), move into engagement and separate a thin charge from the filler supply. The separating plate 70 preferably is tapered at its advancing edge in order to facilitate the cleavage of the charge from the column of compacted tobacco retained within the magazine 23, as it follows the knife blade 71 which oscillates rapidly in a slot formed in the advancing edge of the plate. This knife, therefore, only cuts the upturned steps or other leaf obstructions which are not substantially parallel as a part of the laminated tobacco column. It is to be observed that substantially the full width of the large bunch length sections, as originally cut from the tobacco stream fed to the machine, has been retained even though the several lengths have been converted into a vertical column of tobacco, because there has been no additional cutting at right angles to the level of the leaves in the column, since the leaf sections were cut from the stream, hence in the formation of bunch charges I have practically eliminated the presence of short particles or pieces of tobacco commonly known as "slivers and strings" which are often formed in the production of bunch charges wherein there are several cutting operations. Since the remainder of the charge separating and operating mechanism therefor consists of substantially the same parts as in my co-pending application, I have omitted any further showing of the same in the present case.

When a thin charge has been separated from the column of tobacco, a plunger 74 mounted on plate 73, travels between the separating plate 70 and the magazine bottom plate 31 to force the separated thin charge into a pocket 75 of a transfer device indicated generally at 76 (Fig. 1). After loading the transfer device, the plunger plate 73 and plunger 74 are retracted and the magazine bottom plate 31 is elevated to a suitable distance from the separating plate 70 so that the remaining filler supply will be supported after the separating mechanism is retracted.

In the operation of the machine there is generally a column of tobacco in the magazine as long as tobacco is being fed from the feeding mechanism upon platform 40 and conveyed to the magazine. However, whenever the feed of tobacco to the magazine ceases, the machine continues to operate and in this manner, bunch charges are removed from the magazine until all the tobacco forming the column of tobacco has been formed into charges and ejected from the magazine. It will be seen, therefore, that there is no danger of any tobacco remaining in the column at the close of a day's run, and that when the machine is again operated to make cigars, the vertical column of tobacco in the magazine will be formed of fresh tobacco.

Figure 5:
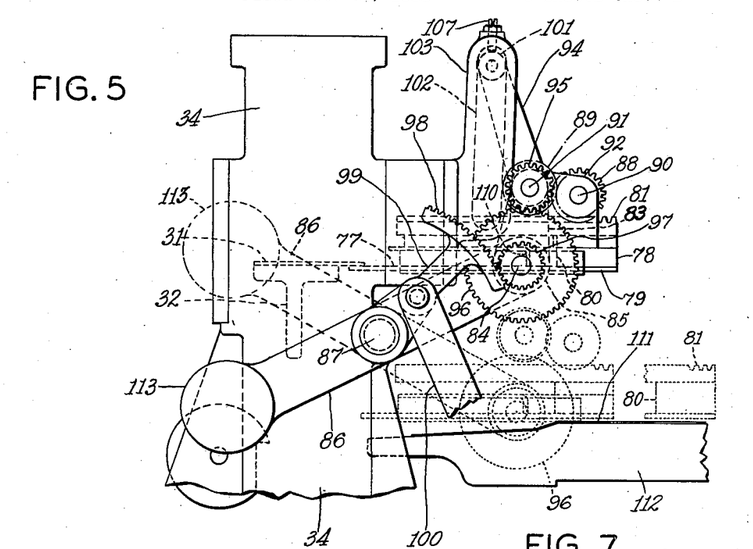
Fig. 5 is an end view of an improved transfer which receives a thin severed charge from the filler supply and delivers it to the rolling means of the machine.
Figures 6, 7:
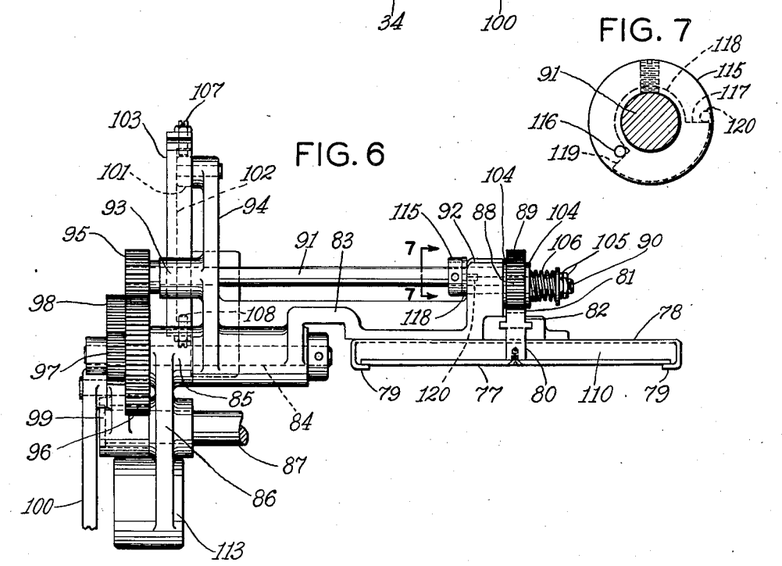
Fig. 6 is a front view of Fig. 5.
Fig. 7 is a sectional end view taken on line 7—7 of Fig. 6.

The transfer device, Figs. 1, 5 and 6, consists of a sliding bottom plate 77 and a rectangular U shaped chamber 78 which, together form the pocket 75. Member 78 includes extending side shelf portions 79 along which the bottom plate 77 slides. This plate is secured to a portion 80 of a rack 81 guided in a slot 82 of a swinging bracket 83 mounted on a shaft 84 supported in a hub 85 of an arm 86 pivoted on a shaft 87 fixed in the slide bracket 34. The rack is operated by a gear 88 in mesh with a gear 89, gear 88 is mounted on a stud 90 and gear 89 is mounted at one end of a shaft 91, both of which are supported in a lug 92 of bracket 83. The other end of shaft 91, which is supported in a central hub 93 of an arm 94, forming a part of bracket 83, carries a gear 95 which meshes with a gear 96 on shaft 84. A gear 97, secured to gear 96, is driven by means of a segment 98, which is part of an arm 99 pivoted on shaft 87, the arm 99 being connected by a link 100 to a cam (not shown) which imparts motion to the segment 98 and its co-acting gears.

Arm 94 of bracket 83, at its upper end is equipped with a roller 101 adapted to engage in a track 102 of a bracket 103 supported by slide bracket 34. The track 102 guides the entire transfer device in its up and down travel from its full line position to a position shown in dotted lines (Fig. 5). It will be noted from a reference to Fig. 5 that the transfer pocket is maintained in substantially horizontal position when bunch charges cut from the vertical column of tobacco in magazine 23 are pushed therein by pusher 71, and that the pocket is held in a horizontal position at the conclusion of its travel from the receiving to the delivery station where a charge is deposited upon the Chianti belt 111. During the ascent or descent of the transfer device the open or close position of the bottom plate 77 is maintained by means of the gearing heretofore described and is held from moving by means of frictional washers 104 such as made from fiber or other suitable material (Fig. 6) placed at each side of the gear 88 on stud 90. This stud is also provided with lock nuts 105 which permit means for tensioning a spring 106 bearing against one face of fiber washer 104 as shown in Fig. 6, so as to hold the gearing inactive until roller 101 engages the top screw 107 or bottom screw 108 at which time the link 100 overcomes the friction mechanism of gear 88 and permits the segment 98 to turn gear 97 whereby motion is transmitted to gear 88 thereby operating rack 81 and bottom plate 77 attached thereto either to open or close the charge transfer pocket depending upon the position of arm 94.

When the roller 101 carried by arm 94 engages said screw 108, the transfer device 76 has reached its lowermost position after a vertical translation with a substantially parallel motion and sides 79 rest upon belt 111 as shown in dotted lines in Fig. 5. Although the downward movement of the transfer pocket has ceased, the continued oscillation of gear sector 98 is responsible for the reciprocation of plate 77 relative to the upper member 78 of the transfer 76 and the plate moves to the right as shown in Figs. 1 and 5. This travel of plate 77 causes the thin charge located within pocket 75 to stop against a vertical wall 110 forming the back of member 78, and the continued movement of plate 77 eventually allows the charge to be deposited and substantially intact upon a rolling apron 111 overlying a rolling table 112 of the machine. The charge thus deposited on the rolling apron 111, the transfer device is lifted to its up-position by link 100 with the aid of a counterbalance 113 on arm 86, the gearing remaining inactive until roller 101 engages screw 107. The transfer device is constrained to move in a path rearwardly and upwardly and therefore does not disturb the charge by its movement. This engagement permits the additional travel of link 100 to overcome the tension of the frictional holding means of the gearing and return the rack 81 and its plate 77 to their original position in readiness to receive the next charge.

The screw 107 provides means for adjusting the position of plate 77 with plate 31 and screw 108 provides means for adjusting the position of the transfer device in respect to the rolling table 112.

A collar 115 fastened to shaft 91 (Figs. 6 and 7) is provided with a pin 116 adapted to engage an extending step 117 of a floating washer 118 on shaft 91. It is seen, that as the shaft revolves, the pin 116 will advance and engage step 117 and turn washer 118, thereby advancing its other stepped portion 119 towards a stationary pin 120 in lug 92. This feature prevents the rack 81 from being accidentally pulled out of engagement with its gear, as any additional travel of the rack will turn shaft 91 and cause step 119 of the floating washer to engage stop pin 120 whereby the rotation of shaft 91 will be stopped as pin 116 engages step 117.

Figures 8, 9, 13:
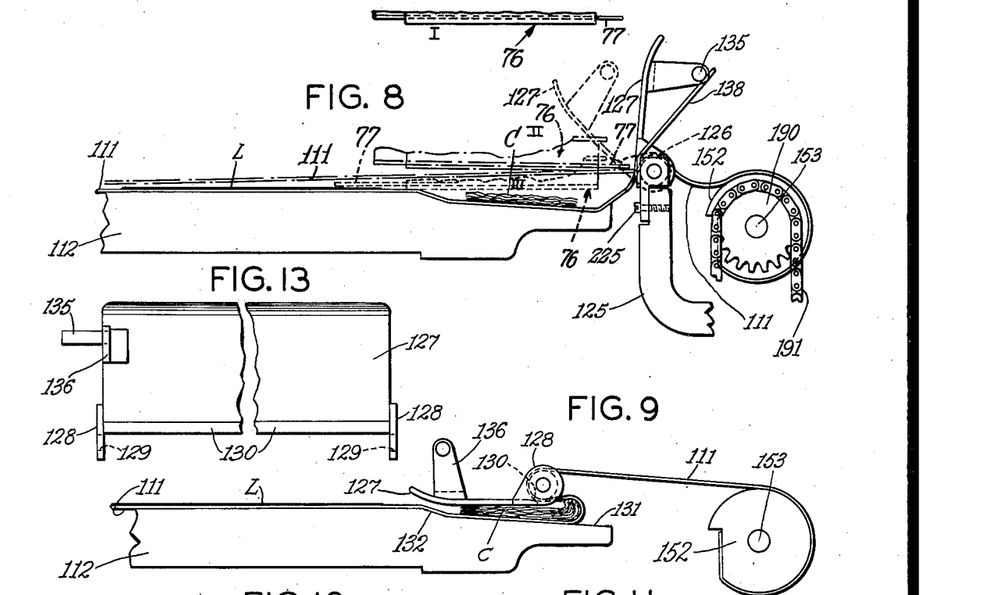
Figs. 8 to 12, inclusive, are end views showing the successive steps in rolling the bunch.
Fig. 13 is a plan view of a pressure plate used in conjunction with the rolling means.

With the separated thin flat charge C in place on the rolling apron 111 (Fig. 8) bracket 125, which may be similar in construction to that shown in my co-pending application, of the rolling means advances its rolling pin 126, and a plate 127 movably mounted on the bracket, which in being forwarded descends and engages the charge C. Plate 127, as shown in Figs. 9 and 13, is provided with bearings 128 having holes 129 to fit loosely on the ends of the rolling pin, the plate 127 being beveled at 130 in order to fit closely to the rolling apron portion passing around its pin. Figure 8 illustrates the transfer 76 in its movement from position I above the upper edge of plate 127 to position II where it presses downwardly upon the tensioned belt 111 which is held with a snubbing action by rolling pin 126 and plate 127 to position III shown in dotted lines where a charge C is deposited on the apron. During this downward movement, transfer 76 will interfere with the downward swinging movement of plate 127 which will take place as the transfer engages the belt 111 which shifts from the tensioned position shown in dotted lines to the relaxed position shown in full lines, wherein transfer 76 is shown in dotted lines with the charge supporting plate 77 of the transfer 76 retracted for depositing the charge on the apron 111 and with plate 127 resting against the transfer. Immediately upon the transfer moving upward from position III to position I past the upper edge of plate 127, the inclined position of a portion of belt 111 and gravity tend to cause the plate 127 to assume the position shown in Figure 9. The dotted outline of transfer 76 and plate 127 in Figure 8, indicate the manner in which the transfer prevents downward swinging movement of plate 127.

The forward travel of the rolling pin 126 loosens the apron further and allows the plate 127 to fall flat by gravity upon charge C resting on the apron overlying the depressed portion 131 of the rolling table 112. The advance of the rolling pin to a position shown in Fig. 9, causes the forward end of the flat charge C to be rolled by the loop of the apron, and as a result, the loop of the apron first rolls up the charge from its forward edge while the remainder of the charge is held flat by plate 127.

Figure 10:
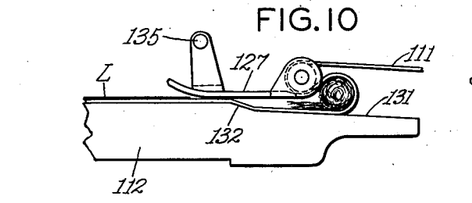
Figure 11:
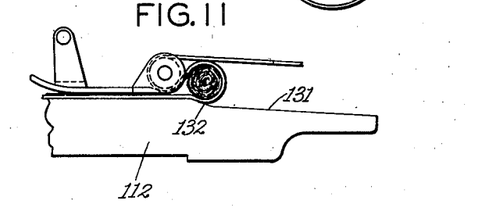
Figures 12, 19:
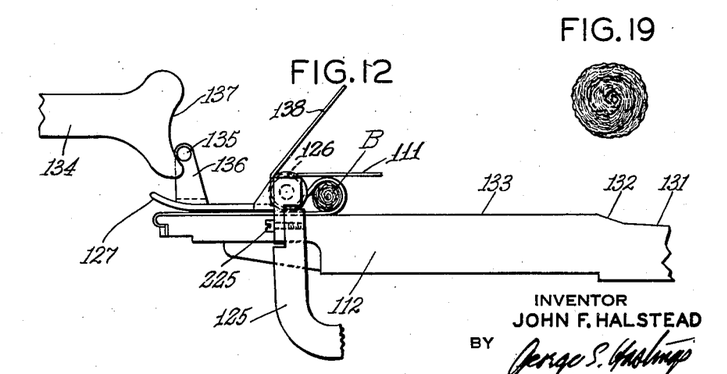
Fig. 19 is a cross sectional view showing the form a bunch charge assumes after being spiralled upon itself at the completion of the first stage of the rolling operation.

Thus, as the rolling pin 126 advances towards the position shown in Fig. 10, the flat charge is rolled upon itself from one edge to the other somewhat as a carpet is rolled up, producing a loose, naturally round bunch without any crevices, joints or "flats" such as may often result from rolling a thick and narrow charge. In approaching the position shown in Fig. 11 the layer has been completely rolled into loose bunch form. In Fig. 19 there is shown approximately the form a thin flat charge assumes at the conclusion of the initial rolling operation. When the apron has rolled up and passed the inclined portion 132, the rolled charge travels over the flat surface of the table 133 whereupon after a short travel the apron is tightened, by means hereinafter described, to compress the charge and constrict it peripherally to the desired diameter. In the further movement over the flat surface 133 of the table, a binder leaf L, previously placed on the apron and held in position by suction, by means well known in the art, is wound about the charges and forms a cigar bunch B of desired size as shown in Fig. 12.

The plate 127, in approaching the rear end of the rolling table 112 is lifted from apron 111 by means of a cam piece 134 which engages a stud 135 projecting from a bracket 136 secured to plate 127. Member 134, which is suitably mounted on the machine frame, is provided with a curved surface 137 which gradually lifts stud 135 and consequently plate 127, as it is being advanced, and returns the stud to its initial position against the stop 138 (Fig. 8) which holds the plate 127 in substantial vertical position.

In order to properly control the movement of the apron 111 one end thereof is secured about roller 152 mounted on shaft 153 suitably supported in the machine in a manner well known in the art. Fixed to the shaft 153 is a sprocket 190 about which tracks a sprocket chain 191 trained around the bottom roller 192 fixed in a journal secured to a chain tightener 193 connected to a chain tightener arm 194 pivotally mounted in the machine. In order to tension or loosen the rolling apron 111 at the desired time during the operation of the machine a lever 195 pivotally mounted in a manner similar to that shown in Patent No. 1,442,200 issued January 16, 1923, to V. J. Wahlstrom, and provided with a cam follower 198 tracks a cam 197 fixed to cam shaft 196 of the machine. The rolled bunch B upon reaching the desired end of table 112 may either be taken from the apron or it may be delivered by suitable means to a transfer unit of the machine (not shown). The bracket 125 is then restricted and returns the rolling pin 126 and plate 127 to the starting position in readiness for rolling the next charge.

Figure 14:
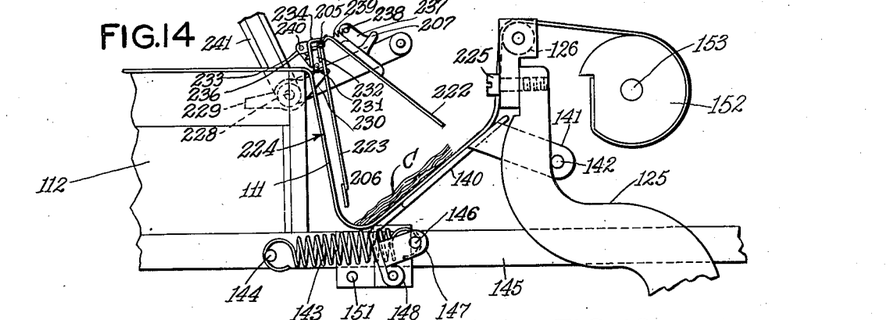
Figs. 14, 15 and 16 are end views, disclosing a modified form for rolling the bunches.
Figure 15:
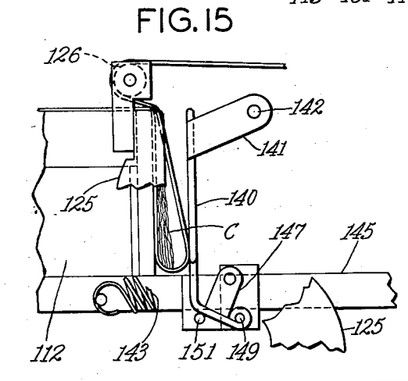
Figure 16:
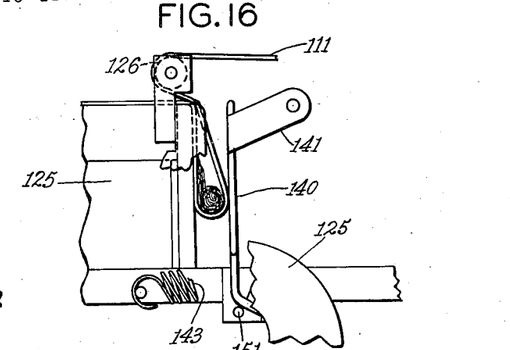
Figure 17:
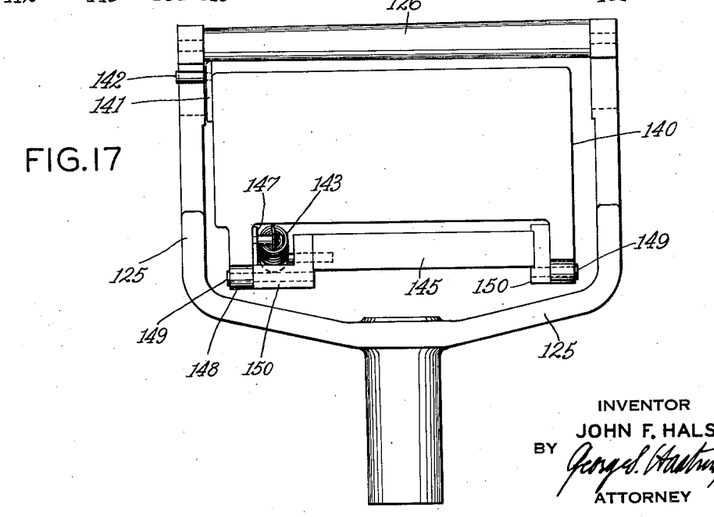
Fig. 17 is a front view of the mechanism shown in Figs. 14, 15 and 16.

Referring to Figs. 14 to 17, which disclose a modified method of rolling a bunch, the charge C is placed, by suitable means such as a device of the type shown in my co-pending application hereinabove referred to, upon the inclined portion of the rolling apron 111 overlying a plate 140. This may take the form of relatively separable members of a swinging transfer device 224 comprising plates 222 and 223 hinged together at 205 and held open to receive tobacco charges by the engagement of the magazine bottom plate 31 with an edge 206 formed on plate 223. Plate 222 is suitably secured to a bracket 207 fixed on a shaft 228 which carries two arms 229, 230 to coact with a pin 231 mounted on a block 232. The block 232, one part of which is up-turned at 234 is attached to the plate 223 at 236. A lug 237 on bracket 207 carries a pin 238 from which a spring 239 is attached to a pin 240 on a lug formed on a plate 234, which spring normally tends to draw plate 223 towards plate 222 into layer holding position. A slotted cam arm 241 integral with the bracket 207 is operated by suitable means (not shown) to move bracket 207 relative to arms 229 and 230 so that as the movement of the slotted arms turns the bracket 207 about its pivot, shaft 228, the transfer plates 222 and 223 will be opened to discharge a charge of tobacco C onto the apron (as shown in Figure 14) and then closed by engagement of arm 229 with pin 231. Plate 140, at its upper end is provided with an extending lug 141 having a pin 142 which is normally held against bracket 125 by a tension spring 143. This spring is stretched between a post 144 in a bar 145, of the machine and a post 146 carried by an extending lug 147 located at the lower portion of the plate 140. The lower end of plate 140 terminates in a loop 148 which provides means for loosely mounting it on studs 149 supported in blocks 150 secured to bar 145. It is seen that as bracket 125 advances, the spring 143 will pull plate 140 to a vertical position (Fig. 15) stopping against a stud 151, in this latter position a loop being formed for the rolling apron 111. The tightening of apron 111 by roller 152 causes the looped portion of the apron to ascend in the space between plate 140 and the forward end of table 112 and in so doing, it starts to roll the flat charge C as seen in Fig. 16. The further advance of the bracket 125 brings the charge into contact with a binder leaf which is wound around the charge producing a bunch of the desired size.

Figures 18, 20:
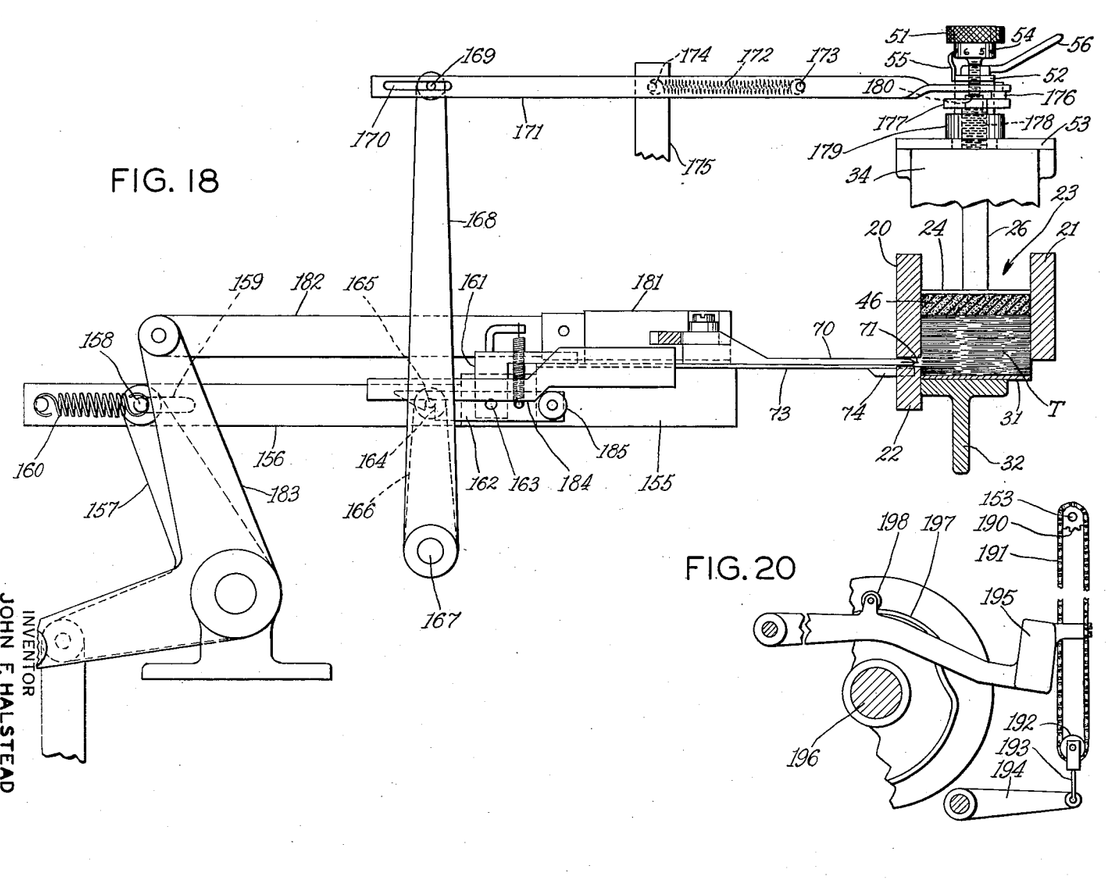
Fig. 18 shows a modified charge forming mechanism having means for automatically regulating the thickness of the bunch charges.
Fig. 20 is a detail showing the mechanism for operating the bunch rolling apron.

In placing the filler tobacco progressively into the belt formed channel of a filler feed mechanism of a type such as that shown in Patent No. 1,740,571 granted December 24, 1929, to W. B. Bronander, known in the art, in most cases the leaves tend to build up in the center of the channel, laterally, resulting in a tapering of the stream of leaves towards the side walls because of the general irregular shape of the leaves. When this tobacco column is severed by a corrugated cutter mechanism which may be of the type disclosed in the Bronander patent referred to, but not shown herein, and delivered by means, heretofore described and shown, into the magazine 23, it rests on top of the filler tobacco T previously delivered. When the tobacco stored in the magazine is acted upon by the compressor pad 46, this resilient pad tends to yield to the high portions of the tobacco and will exert pressure at the lower and softer portions so as to press the tobacco against the magazine plate to a more or less uniform density over the area of the charge to be cut off. It should be remembered that as the filler tobacco builds-up in the magazine 23 in substantial laminations due to the manner in which tobacco is fed thereto, and since most of the charges delivered, are more or less tapered in cross section, the central portion of the stored tobacco may be more dense than the parts adjacent the side walls 20 and 21, and for this reason even though the pad 46 yields to high portions there is a limit to the give of the pad at which time the tobacco adjacent the walls will not be fully compressed. If a charge of this kind is severed and separated from the mass of tobacco T in the magazine and later is rolled up to form a cigar, there may be quite a difference in the weight of this particular cigar from one rolled when the charge is practically uniform in density. To overcome this inconsistency in the density of the filler column and also the resultant difference in weight of the finished cigars, the plunger 74 in the modified form shown in Fig. 18, is employed to perform two duties, first, as a feeler to check the density of the column of tobacco and at the same time set a compensating device, and second, as a pusher to eject the separated thin charge from magazine 23 into the pocket of the transfer device which delivers the tobacco to the rolling means of the machine.

The plunger 74 is carried by the plunger plate 73 secured to a sliding block 155 operated by a link 156 deriving motion from a bell-crank lever 157 having suitable connections to a cam, not shown. The upper end of lever 157 has a stud 158 engaging in a slot 159 of link 156, stud 158 being normally held in the position shown in Fig. 18 by a spring 160. When plunger 74 is actuated to feel the lower portion of the filler tobacco, it advances into the tobacco until the density of the same overcomes the tension of spring 160 whereupon any additional travel of the plunger will be stopped as stud 158 will pass freely in the slot 159. When the tobacco is of the desired density, the slot 159 is long enough to take-up the travel of stud 158 and the plunger will remain inactive. The block 155 carries a holder 161 supporting a latch 162 loosely mounted on a stud 163, latch 162 having an open slot 164 engaging a pin 165 of an arm 166 mounted on a shaft 167. The movement of block 155 causes latch 162 to swing arm 166 and an arm 168, the latter at its upper end being provided with a stud 169 engaging in an elongated slot 170 of a link 171. Stud 169 is normally held against the end of slot 170 by a spring 172 stretched between a post 173 of the link and a post 174 carried by an upright column 175 secured to the bed of the machine.

The other end of link 171 connects to a stud 176 in an arm 177 which is clamped to the shouldered end of a spindle 178 turning in a threaded hub 179 secured in plate 53. The movement of link 171 causes spindle 178 to turn whereby the magazine bottom plate 31 by means of its connections will, due to the rocking of screw 51, descend, thus increasing the thickness of the thin charge about to be severed and separated from the mass of filler tobacco in magazine 23. The plunger 74 is now retracted to its starting position and in so doing also returns the arms 166 and 168 to their original position. The link 171 retains its position as adjusting screw 51 bears against a fiber insert 180 provided in spindle 178, thus holding spindle 178 from turning and thus stud 169 will pass freely in slot 170.

The knife 71, having suitable connections to its sliding block 181 operated by a link 182 deriving motion from a bell-crank lever 183 connecting to a cam, not shown, now advances and severs a charge from the filler tobacco. The thickness of this charge will depend, therefore, on the automatic setting of spindle 178. Knife 71 is reciprocated continuously by mechanism similar to that shown in my identified co-pending application. The advance of block 181 causes a cam piece 184, secured to the block, to engage a roller 185 of latch 162, thus depressing the same, causing slot 164 to become disengaged from pin 165 of arm 166. It is seen that as the plunger is advanced to expel the severed charge into the pocket of the transfer means, arms 166 and 168 will remain stationary. With the transfer pocket loaded, the plunger is again retracted to its starting position, and the bottom plate 31 is elevated to a suitable distance from the separating plate 70 so that the remaining filler supply will be supported after the separating mechanism is retracted. The ascent of bottom plate 31 also raises screw 51 from insert 180 whereby the spring 172 returns the link 171 to its original position.

The invention above described may be varied in construction within the scope of the claims, for the particular device, selected to illustrate the invention, is but one of many possible concrete embodiments of the same. The invention is not, therefore, to be restricted to the precise details of the structure shown and described.

What is claimed is:

1. In a cigar machine, the combination with a vertical magazine, and means for feeding tobacco thereto, of means for forming a vertical column of tobacco in said magazine, a plunger movable in said magazine, and a sponge rubber tobacco engaging pad secured to said plunger for compacting said tobacco in said column.

2. In a cigar machine, the combination with a vertical magazine, and means for feeding bunch length sections of tobacco thereto, of means for stacking said sections in said magazine in a vertical column, and a device provided with a yielding tobacco engaging face arranged to compact the tobacco in said magazine.

3. In a cigar machine, the combination with a vertical magazine, and means for feeding tobacco thereto, of means for forming a vertical column of tobacco in said magazine in laminated layers, a movable member providing a support for said column of tobacco, means for raising and lowering said member, and a plunger provided with a yielding tobacco engaging surface coacting with said member to compress tobacco in said magazine.

4. In a cigar machine, the combination with a magazine for holding a vertical column of tobacco, of means for separating thin bunch charges of a width several times their thickness from said column, a plunger provided with a sponge rubber pad actively engaging the top of said column of tobacco during the severance of said charge, a bunch charge transfer located adjacent an end of said magazine, and means for delivering a separated charge from said magazine to said transfer.

5. In a cigar machine, the combination with a magazine, of means for feeding successive bunch length sections of long filler tobacco to said magazine, a reciprocating gate, means for moving sections onto said gate when it is in magazine closing position, a bottom member supporting said tobacco in said magazine, a plunger provided with a sponge rubber face arranged to compact tobacco on said gate, means for raising said member to bring the tobacco positioned thereon into engagement with the underside of said gate, said gate being arranged to be withdrawn whereby tobacco positioned thereon is discharged into said magazine by the said member and said plunger.

6. In a cigar machine, the combination with a vertical magazine for holding a column of tobacco, of a plate movable in said magazine for supporting said column, means for separating bunch charges of tobacco from said column, and means controlling the position of said plate in said magazine to regulate the thickness of each charge separated.

7. In a cigar machine, means for confining a vertical column of tobacco, means for compacting said column to a predetermined density, means for separating bunch charges as relatively thin flat layers from an end of said column, means movable into and out of engagement with said column prior to the separation of a charge for controlling the thickness of each charge separated from said column, and mechanism coacting therewith for actuating said controlling means each cycle of the machine.

8. In a cigar machine, the combination with a vertical magazine for holding a column of tobacco, of a plate movable in said magazine for supporting said column, means for separating bunch charges of tobacco from said column, and means for controlling the position of said plate in said magazine to regulate the thickness of charges cut from said column, said means comprising, a bracket mounted on said machine, a slide mounted for movement in said bracket and supporting said plate, a stop member positioned on said bracket, and adjustable means carried by said slide and arranged to engage said member for controlling the movement of said slide and plate.

9. In a cigar machine, the combination with a vertical magazine containing a column of tobacco, of a bracket, a slide mounted in said bracket, a support for said column fixed to said slide, means for moving said slide to raise and lower said column to add to and to remove tobacco therefrom, means for removing bunch charges from said column, and means for limiting the movement of said support to control the thickness of said charges.

10. A transfer for bunch charges comprising a pair of spaced plates forming a charge transfer pocket, means for moving said pocket from a charge loading to a charge delivery station, and means operative at said delivery station for moving one of said plates relative to and in a plane parallel to the other to deliver said charge.

11. A bunch charge transfer for a cigar machine comprising, an upper flat U-shaped plate, and a lower flat plate cooperating therewith to form a charge receiving pocket, a rack fixed to said lower plate, means for moving said pocket from a charge receiving to a charge delivery station, and means cooperating with said rack at said delivery station for moving said lower plate to eject said charge from said pocket.

12. A transfer for a cigar machine comprising an inverted U-shaped upper plate, a lower plate cooperating therewith to form a charge transfer pocket, a rack fixed to said lower plate, a pinion mounted upon said upper plate, means moving said pocket to a charge delivery position, and means operative at said position for rotating said pinion to move said rack and thereby cause said lower plate to move relative to the upper to discharge a charge from the pocket, and means for limiting the movement of said rack.

13. A transfer for a cigar machine comprising an inverted U-shaped upper plate, a lower plate cooperating therewith to form a charge transfer pocket, a stripper plate mounted on said upper plate closing one end of said pocket, a rack fixed to said lower plate, a pinion mounted upon said upper plate, means moving said pocket to a charge delivery position, and means operative at said position for rotating said pinion to move said rack and thereby cause said lower plate to move relative to the upper, whereby said stripper plate sweeps said charge from said lower plate.

14. In a cigar machine, the combination with means for feeding sections of tobacco, of a magazine, a member movable in said magazine for supporting a column of tobacco, a plunger coacting with said member for compacting said column to a predetermined density, means for separating bunch charges of tobacco from said column, a device for testing the density of each charge to be separated, and means operating in response to the action of said device for controlling the movement of said member to vary the thickness of charge to be cut from said column.

15. In a cigar machine, the combination with a device for feeding sections of filler tobacco, of a magazine arranged to receive said sections and form a column thereof, a member movable in said magazine for supporting said column, means for lowering said member an initial amount, means for separating bunch charges of tobacco from said column after said member has been lowered, mechanism for testing the density of the tobacco in said column prior to the separation of a charge therefrom, means controlled by said mechanism for lowering said member in said magazine an additional amount to increase the thickness of charge to be cut, and means for ejecting a severed charge from said column.

16. A transfer for cigar bunch charges comprising, a substantially flat upper plate and a lower plate spaced therefrom and substantially parallel thereto, means for holding said plates in pocket forming position for receiving and holding a charge of tobacco for transfer, a rack mounted on said lower plate, a pinion mounted on said upper plate and cooperating with said rack for moving said lower plate relative to said upper to discharge said charge.

17. In a cigar machine, the combination with a vertical magazine, of means for forming a vertical column of tobacco in said magazine, means for separating bunch charges from an end of said column, a charge transfer comprising a plurality of relatively movable members lying substantially in horizontal planes spaced to receive successive charges horizontally, a bunch rolling mechanism, means for moving said members to said mechanism while maintaining the charges and members in substantially horizontal planes, and means for moving one of said members relative to the other, and in a plane parallel thereto for delivering a charge to said mechanism.

18. In a cigar machine, the combination with a vertical magazine containing a column of long filler tobacco, of means for compressing the column of tobacco to a predetermined density, a device for separating bunch charges of tobacco from an end of said column while said column is held under compression, a pair of parallel plates forming a charge transfer pocket located adjacent said magazine, means for loading said pocket with separated charges, and means for moving one of said plates of said pocket relative to the other and in a plane parallel thereto for effecting the removal of charges from said pocket.

19. In a cigar machine, the combination with a vertical magazine containing a column of long filler tobacco, of means for compressing a column of tobacco to a predetermined density, a device for separating bunch charges of tobacco from an end of said column while said column is held under compression, a pair of parallel plates forming a charge transfer pocket located adjacent said magazine, means for loading said pocket with separated charges, mechanism for moving one of said plates of said pocket relative to the other and in a plane parallel thereto for effecting the removal of charges from said pocket, said mechanism comprising a rack mounted upon one of said plates, a pinion engaging said rack mounted upon the other, and means for moving said rack and pinion to operate said plate.

20. In a cigar machine, the combination with a vertical magazine containing a column of long filler tobacco, of means for compressing the column of tobacco to a predetermined density, a device for separating bunch charges of tobacco from an end of said column while said column is held under compression, a pair of parallel plates forming a charge transfer pocket located adjacent said magazine, means for loading said pocket with separated charges, mechanism for moving one of said plates of said pocket relative to the other and in a plane parallel thereto for effecting the removal of charges from said pocket, said mechanism comprising a rack mounted upon one of said plates, a pinion engaging said rack mounted upon the other, means for moving said rack and pinion to operate said plate, and means for limiting the movement of said movable plate.

21. In a cigar machine, a vertical magazine containing a supply of tobacco, a movable member supporting said tobacco, a tamping member cooperating with said member for compressing said tobacco to a column of uniform density, means for separating bunch charges of tobacco from an end of said column, means for controlling the thickness of charges separated from said column, a charge transfer pocket comprising a pair of spaced parallel plates located adjacent said magazine, means for separating tobacco from said column while said column is compressed, a device for delivering a compressed charge into said pocket, means for moving said pocket with the plates thereof maintained in substantially horizontal planes, and means for opening said pocket for discharging said charge.

22. In a cigar machine, a vertical magazine containing a supply of tobacco, a movable member supporting said tobacco, a tamping member cooperating with said member for compressing said tobacco to a column of uniform density, means for separating bunch charges of tobacco from an end of said column, means for controlling the thickness of charges separated from said column, a charge transfer pocket comprising a pair of parallel spaced plates located adjacent said magazine, means for separating tobacco from said column while said column is compressed, a device for delivering a compressed charge into said pocket, means for moving said pocket with the plates thereof maintained in substantially horizontal planes, and means for opening said pocket for discharging said charge, said opening means including a cooperating device for effecting relative movement of one of said plates in a plane parallel to the other.

23. A charge transfer for a cigar machine comprising, a pocket provided with spaced substantially parallel tobacco confining members engaging the top and bottom of a charge, means for moving said pocket with a substantially parallel motion with said members maintained in substantially horizontal planes during said movement from a charge receiving to a charge delivery station, means for effecting the discharge of said charge at said delivery station, and a stripper coacting therewith for removing said charge from said pocket.

24. A transfer for bunch charges comprising, a pair of spaced relatively movable plates forming a pocket, means for holding said pocket in charge retaining position, means for moving said plates to a charge delivery position, mechanism for moving one of said plates in a plane parallel to the other to effect the discharge of a charge from said pocket, and stripping means carried by the other of said plates for removing said charge from said moving plate.

25. In a cigar making machine, the combination with a bunch rolling unit having a rolling table, and a rolling belt, of a traveling member, a rolling pin mounted in said member and arranged for cooperation with said belt for rolling a bunch charge therein to bunch form, a movable plate mounted on said member, and means for effecting movement of said plate into clamping engagement with a charge on said belt prior to the institution of the rolling movement.

26. In a cigar making machine, the combination with a bunch rolling unit having a rolling table, and a rolling belt, of a traveling member, a rolling pin mounted in said member and arranged for cooperation with said belt for rolling a bunch charge therein to bunch form, a movable plate mounted on said member, means for effecting movement of said plate into engagement with a charge positioned on said belt, said plate being so constructed and arranged that it maintains said charge flat on said belt prior to its formation into a loose bunch.

27. In a cigar making machine, the combination with a bunch rolling unit having a rolling table, and a rolling belt, of a traveling member, a rolling pin mounted in said member and arranged for cooperation with said belt for rolling a bunch charge therein to bunch form, a movable plate mounted on said member, means for locating a bunch charge of tobacco on said belt, means for effecting movement of said plate into engagement with said charge, said plate being so constructed and arranged that it maintains said charge substantially flat on said belt prior to its formation into a loose bunch, means for moving said member to spiral said charge upon itself into a loose bunch form, and means for tensioning said belt following the completion of the rolling of said charge into loose bunch form to peripherally constrict the loose bunch to a predetermined smaller diameter.

28. In a cigar machine, the combination with a bunch rolling unit, having a rolling table and a rolling belt located thereon, of a traveling member, a rolling pin supported in said member, a pivoted plate carried by said member for holding a charge on said belt, and means for gravity biasing said plate for movement into engagement with said charge.

29. In a cigar machine, the combination with a bunch rolling belt, of a travelling member, a rolling pin for forming a loop in said belt, and a movable plate carried by said member for holding a bunch charge on said belt.

30. In a cigar machine provided with a bunch rolling unit having a rolling table, a rolling apron positioned upon said table for movement relative thereto, a traveling member, a rolling pin mounted on said member for cooperation with said belt, and a pivoted plate mounted on said member for holding a charge of tobacco flat upon said belt.

31. In a cigar machine, the combination with a bunch rolling unit having a rolling apron, of means for transferring substantially thin flat bunch charges of tobacco onto said apron, and means for maintaining a portion of each charge in substantially flat condition while the remainder of the charge is being rolled in said apron into bunch form.

32. In a cigar machine, the combination with a bunch rolling unit having a rolling apron, of means for transferring substantially thin flat bunch charges of tobacco onto said apron, a device for maintaining a portion of each charge in substantially flat condition while the remainder of the charge is being rolled in said apron into a loose bunch like article, means for tensioning said apron to constrict said article peripherally, and thereby reduce its diameter prior to its envelopment in a binder, and means for lifting said device from said apron at the conclusion of said rolling operation.

33. In a cigar machine, the combination with a bunch rolling unit having a rolling apron, of means for transferring substantially thin flat bunch charges of tobacco onto said apron, a plate for maintaining a part of each charge in substantially flat condition while another portion of it is being rolled in said apron into a loose bunch like article, means for tensioning said apron to constrict the article peripherally and thereby reduce its diameter following the rolling operation, means for moving said plate from said apron at the conclusion of said rolling operation, said moving means comprising a cam, and a device on said plate arranged to engage said cam for moving said plate.

34. In a cigar machine, the combination with a magazine for holding a column of filler tobacco, of means for separating bunch charges of tobacco from an end of said column, a device for controlling the amount of tobacco to be separated from said column by said means, including sensing means, and means for moving said sensing means into engagement with a portion of said column prior to the separation of a charge therefrom.

35. In a cigar machine, the combination with means for forming a column of tobacco, of means for compressing said column to a predetermined density, means for separating bunch charges of tobacco from an end of said column, and mechanism arranged to engage a side of said column to test the density of the tobacco in said column adjacent said charge preparing means, and thereby control the quantity of tobacco in each charge.

36. Bunch rolling mechanism for a cigar machine comprising a rolling table, a rolling apron, relatively movable means forming a pocket for said apron, including a pivoted plate and a stationary vertical wall, a traveling bracket, a rolling pin carried by said bracket, a lug mounted on said plate and engaging said bracket, yielding means normally urging said lug into engagement with said bracket, means for moving said bracket towards said wall whereby a charge positioned on said plate is clamped against said wall on said apron in substantially flat condition, and means for continuing the movement of said bracket to traverse said rolling pin over said table for rolling said charge spirally into a bunch.

37. In a cigar machine, the combination with a rolling table having a vertical wall, and an apron extended thereof, of a traveling bracket provided with a rolling pin cooperating with said apron, a pivoted plate spaced from said wall, an arm in said plate engaging said bracket, means for moving said bracket to cause said plate to clamp a bunch charge positioned on said apron against said wall, and means for translating said rolling pin over said table to roll said charge spirally upon itself into a bunch form.

38. Bunch rolling mechanism for a cigar machine comprising a pair of relatively movable charge confining members, a rolling apron located upon said members, and adapted to receive a thin flat tobacco charge thereon, a traveling bracket, a rolling pin mounted on said bracket and cooperating with said apron, and means for advancing said bracket first to clamp said charge between said members, and then to roll said charge spirally upon itself into a bunch.

39. In a cigar machine, the combination with a magazine for holding a column of filler tobacco, of a device for controlling the amount of tobacco to be separated from said column, including a pusher, means for separating a bunch charge from an end of said column, and means for testing the density of said tobacco adjacent said end of said column and for subsequently removing a charge of predetermined size from said magazine.

40. In a cigar machine, the combination with a magazine containing a vertical column of tobacco, of means for removing charges containing a predetermined quantity of tobacco therefrom, comprising a pusher, means for moving said pusher against said column to determine the quantity of tobacco to be removed, means for retracting said pusher, a device for separating a charge from said column, and means for moving again said pusher to eject said charge from said magazine.

41. In a cigar machine, the combination with a magazine containing a vertical column of filler tobacco, of means for moving substantially thin flat charges of tobacco from said column, including a pusher, mechanism for moving said pusher into engagement with said tobacco to determine the amount of tobacco to constitute a charge, means for retracting said pusher at the conclusion of said operation, a charge separating member movable relative to said pusher to separate said charge from said column, and means for re-advancing said pusher to eject said separated charge therefrom.

42. In a cigar machine, the combination with a magazine containing a vertical column of filler tobacco, of a separating device for separating bunch charges of tobacco from an end of said column, a pusher cooperating with said means to determine the quantity of tobacco separated as a charge, and to eject said charge from said magazine, means for advancing said pusher into engagement with said tobacco in said column, means for withdrawing said pusher mechanism connected to said pusher and responsive to its advancing movement for controlling the amount of tobacco to be separated including a latch, a lever provided with a pin engaging said latch, a cam follower mounted on said lever, and a cam carried by said separating device positioned to engage said cam follower to disconnect said pusher from said mechanism and means for reinstituting the forward movement of said pusher to eject said charge from said magazine.

43. In a cigar machine, the combination with a magazine for holding a column of filler tobacco, of a movable supporting member for said tobacco, means for raising and lowering said member in said magazine, means for separating bunch charges of tobacco from an end of said column, and a device operative prior to the separation of each charge of tobacco for controlling the amount to be separated from said column, said device including, a detector arranged to bear against said column, and means for lowering said member whenever said detector indicates that an insufficient quantity of tobacco is about to be removed.

44. In a cigar machine, the combination with a magazine for holding a column of filler tobacco, of a movable plate for supporting said tobacco in said column, means for raising and lowering said plate, whereby a column positioned thereon will be raised or lowered, means for separating bunch charges of tobacco from an end of said column, and a device operative prior to the separating operation for determining the quantity of tobacco to be removed from said column, said device including, a detector arranged to bear against said column, means for lowering said plate beyond its normal position to make available tobacco for separation from said column, and means for stopping said plate against movement until said charge has been separated.

45. In a cigar machine, the combination with a magazine containing a vertical column of filler tobacco, and a movable plate for supporting said column in said magazine, of a separating device for separating bunch charges of tobacco from an end of said column, means for positioning said plate with respect to said device to make available enough tobacco to form one charge, and mechanism for determining the density of each charge prior to its separation comprising a detector, a device under the control of said detector for lowering said plate whenever a quantity of tobacco insufficient to form a charge is presented to said separating device thereby to make available additional tobacco, means for stopping said plate in its adjusted position, means for ejecting a separated charge from said magazine, and means for restoring said plate to its normal position.

46. A transfer for bunch charges of tobacco comprising, a pair of spaced relatively movable plates forming a pocket, means for holding said plates in charge retaining position, and means for moving one of said plates in a plane substantially parallel to the other and relative thereto to effect the ejection of a charge carried by said pocket.

47. In a cigar machine the combination with a vertical magazine, and means for feeding a succession of lengths of long filler tobacco thereto, of means for forming a vertical column of laminated layers of tobacco in said magazine, while maintaining the arrangement of the tobacco in said layers substantially undisturbed, a movable member providing a support for said colunm of tobacco, means for raising and lowering said member, a second member coacting with said movable member for compressing said layers of tobacco to a substantially uniform density, and means associated with one of said members for engaging tobacco in said column with yielding pressure to apply substantially uniform pressure over the entire surface of one end of said column.

48. In a cigar machine, the combination with a magazine containing a vertical column of filler tobacco, of a bunch charge separator, means for effecting relative movement between said column and separator for varying the thickness of charges cut from said column, and a device for controlling said movement and for ejecting separated charges from said magazine.

49. In a cigar machine, the combination with a magazine containing a column of filler tobacco, of a bunch charge separator, and a member for controlling the thickness of charges separated from said column and for ejecting said separated charges laterally from said magazine.

50. In a cigar machine, the combination with a magazine containing a vertical column of tobacco, of a bunch charge separator, means for raising and lowering said column relative to said separator, and a member for controlling the motion of said column to determine the thickness of charges cut therefrom by said separator.

51. In a cigar machine, the combination with a magazine containing a vertical column of filler tobacco, of a separating device for separating layers of tobacco of bunch charge size from said column, a member movable into and out of engagement with said column of tobacco for determining the density of said tobacco in said magazine and removing separated charges therefrom, and mechanism for operating said member comprising, a slotted connecting element, a lever, a stud mounted on said lever and projecting into said slot, a spring fixed to said element and said lever, and means for moving said lever in said slot whereby said spring advances said member into engagement with said tobacco, said last named means also being operative to retract said member and again advance it to engage and eject said layer from said magazine.

52. In a cigar machine, the combination with a magazine for holding a vertical column of filler tobacco, of means for separating layers of bunch charge size from said column, and mechanism testing the density of said tobacco of the tobacco about to be formed into a charge and ejecting said charge after it has been separated therefrom by said separating means, said mechanism comprising, a member movable into and out of engagement with said tobacco, a spring arranged to move said member into engagement with said tobacco, a lever, a lost motion connection between said lever, spring and member, and means for moving said lever to move said member into and out of charge testing and ejecting position.

JOHN F. HALSTEAD.

CERTIFICATE OF CORRECTION.

Patent No. 2,255,740.　　　　　　　　　　　　　　　September 9, 1941.

JOHN F. HALSTEAD.

It is hereby certified that error appears in the printed specification of the above numbered patent requiring correction as follows: Page 8, second column, line 3, claim 19, for "a" before "column" read --the--; page 9, second column, lines 33 and 34, claim 33, for the words "portion of it" read --portion thereof--; page 10, first column, line 67, claim 42, after "pusher" insert the words and comma "from engagement with said tobacco,--; and that the said Letters Patent should be read with this correction therein that the same may conform to the record of the case in the Patent Office.

Signed and sealed this 25th day of November, A. D. 1941.

Henry Van Arsdale,
(Seal)　　　　　　　　　　　　　　　　　　Acting Commissioner of Patents